United States Patent
Sano

(10) Patent No.: US 9,151,348 B2
(45) Date of Patent: Oct. 6, 2015

(54) ELECTROMAGNETIC BRAKE UNIT

(71) Applicant: ALPS ELECTRIC CO., LTD., Tokyo (JP)

(72) Inventor: Tadashi Sano, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 23 days.

(21) Appl. No.: 14/163,592

(22) Filed: Jan. 24, 2014

(65) Prior Publication Data

US 2014/0251738 A1  Sep. 11, 2014

(30) Foreign Application Priority Data

Mar. 11, 2013 (JP) ................................. 2013-047598

(51) Int. Cl.
*F16D 55/02* (2006.01)
*F16D 121/20* (2012.01)

(52) U.S. Cl.
CPC ............. *F16D 55/02* (2013.01); *F16D 2121/20* (2013.01); *F16D 2200/0034* (2013.01); *F16D 2250/0069* (2013.01)

(58) Field of Classification Search
CPC ............ F16D 3/002; F16D 2055/0037; F16D 2121/20
USPC .............................. 188/161, 162, 164, 267, 83
See application file for complete search history.

(56) References Cited

U.S. PATENT DOCUMENTS

| | | | | |
|---|---|---|---|---|
| 3,277,357 A * | 10/1966 | Willis | ............................ | 388/816 |
| 4,523,668 A * | 6/1985 | Uematsu et al. | ........... | 188/251 A |
| 5,989,375 A * | 11/1999 | Bortz | ......................... | 188/251 A |
| 8,002,089 B2 * | 8/2011 | Jasso et al. | ....................... | 188/83 |
| 2012/0056761 A1 * | 3/2012 | Sano | ................................ | 341/35 |
| 2013/0220060 A1 | 8/2013 | Sano et al. | | |

FOREIGN PATENT DOCUMENTS

| | | |
|---|---|---|
| EP | 02161644 B1 | 1/2009 |
| JP | 2010-62075 | 3/2010 |
| JP | 2013-175028 A | 9/2013 |
| WO | WO 2008114754 A1 * | 9/2008 |

* cited by examiner

*Primary Examiner* — Thomas J Williams
(74) *Attorney, Agent, or Firm* — Brinks Gilson & Lione

(57) ABSTRACT

A magnetic brake unit includes an operation unit, a rotating plate placed below the operation unit and coaxially rotating with the operation unit in conjunction with an operation of the operation unit, and an electromagnetic brake that is placed to be in contact with the rotating plate and can magnetically adsorb the rotating plate, in which the rotating plate includes an adsorbed surface in contact with the electromagnetic brake, the electromagnetic brake includes an adsorbing surface in contact with the rotating plate, the electromagnetic brake applies a braking force against a pivoting to the rotating plate when the electromagnetic brake magnetically adsorbs the rotating plate, the rotating plate is pivotable in a state of being in contact with the electromagnetic brake when the electromagnetic brake does not magnetically adsorb the rotating plate, and a polymer material section is formed at least one of the adsorbed surface and the adsorbing surface.

7 Claims, 12 Drawing Sheets

ELECTROMAGNETIC BRAKE UNIT

CLAIM OF PRIORITY

This application claims benefit of priority to Japanese Patent Application No. 2013-047598 filed on Mar. 11, 2013, which is hereby incorporated by reference in its entirety.

BACKGROUND

1. Field of the Disclosure

The present disclosure relates to an electromagnetic brake unit and, more particularly, to an electromagnetic brake unit that can maintain a good operation feeling.

2. Description of the Related Art

Recently, instruments provided with input devices, mounted on vehicles and the like, and operable to fit various modes for in-vehicle temperature setting, car audio volume adjustment, car navigation and the like are available. Some of the input devices have an electromagnetic brake unit so that an operation range of an operator can be limited in response to input details of the various modes. It is required for the input devices that have such an electromagnetic brake unit to be capable of maintaining a sufficient braking force exceeding an operating force of the operator when a brake is applied by the electromagnetic brake unit and, moreover, to be capable of operating smoothly without a feeling of being caught at a time of non-braking. The applicant has filed an electromagnetic brake unit using a rotary input device according to Japanese Patent Application No. 2012-38806 as such electromagnetic brake unit. Also known as a similar technique is an electromagnetic brake unit used in a rotary input device according to Japanese Unexamined Patent Application Publication No. 2010-62075.

The electromagnetic brake unit used in a rotary input device 900 according to Japanese Patent Application No. 2012-38806 will be described referring to FIG. 12. FIG. 12 is a cross-sectional view showing a configuration of the rotary input device 900 according to Japanese Patent Application No. 2012-38806.

In the rotary input device 900 according to Japanese Patent Application No. 2012-38806, a friction plate 908 that is disposed to be connected to an operation unit 902, which is rotation-operated is magnetically adsorbed by an electromagnetic brake 909 so that a braking force is applied and the rotating operation is limited. The friction plate 908 and the electromagnetic brake 909 are always in contact with each other. However, at a time of non-braking without the magnetic adsorption, the friction plate 908 is pivotable in conjunction with an operation that is added to the operation unit 902 and a good operation feeling is provided. Also, at a time of braking with the magnetic adsorption, the electromagnetic brake 909 magnetically adsorbs the friction plate 908 with an electromagnetic force, the friction plate 908 and the electromagnetic brake 909 are in closer contact with each other, and frictional resistance increases so that the braking force is exerted and the rotating operation is limited. In order to maintain the good operation feeling at a time of non-braking and generate the braking force with reliability at a time of braking, a metallic material is used in a friction surface and a surface of the electromagnetic brake 909 that is in contact with the friction surface and a smooth and hard thin film layer is formed on the contact surface by a physical vapor deposition method (PVD method).

It is assumed that the rotary input device 900 according to Japanese Patent Application No. 2012-38806 is forcibly operated by an operator against the braking even at a time of braking. The forcible operation against the braking results in wear debris on the smooth and hard thin film layer formed by the PVD method, which is caused by wear due to sliding and micro-vibration. The hard wear debris acts as a grindstone to accelerate sliding wear, and a scratch is likely on the contact surface between the friction plate 908 and the electromagnetic brake 909. It is concerned that the scratch may exacerbate the operation feeling during the rotating operation by generating the feeling of being caught.

SUMMARY

An electromagnetic brake unit according to a first aspect includes an operation unit that is rotation-operated, a rotating plate placed below the operation unit and coaxially rotating with the operation unit in conjunction with an operation of the operation unit, and an electromagnetic brake that is placed to be in contact with the rotating plate and can magnetically adsorb the rotating plate, in which the rotating plate includes an adsorbed surface in contact with the electromagnetic brake, the electromagnetic brake includes an adsorbing surface in contact with the rotating plate, the electromagnetic brake applies a braking force against a pivoting to the rotating plate in a case where the electromagnetic brake magnetically adsorbs the rotating plate, the rotating plate is pivotable in a state of being in contact with the electromagnetic brake in a case where the electromagnetic brake does not magnetically adsorb the rotating plate, and a polymer material section is formed on at least one of the adsorbed surface and the adsorbing surface.

As above, according to the invention, it is possible to provide the electromagnetic brake unit with which the good operation feeling can be maintained.

DESCRIPTION OF THE EXEMPLARY EMBODIMENTS

Hereinafter, an electromagnetic brake unit 100 according to the first embodiment will be described.

Figure 1:
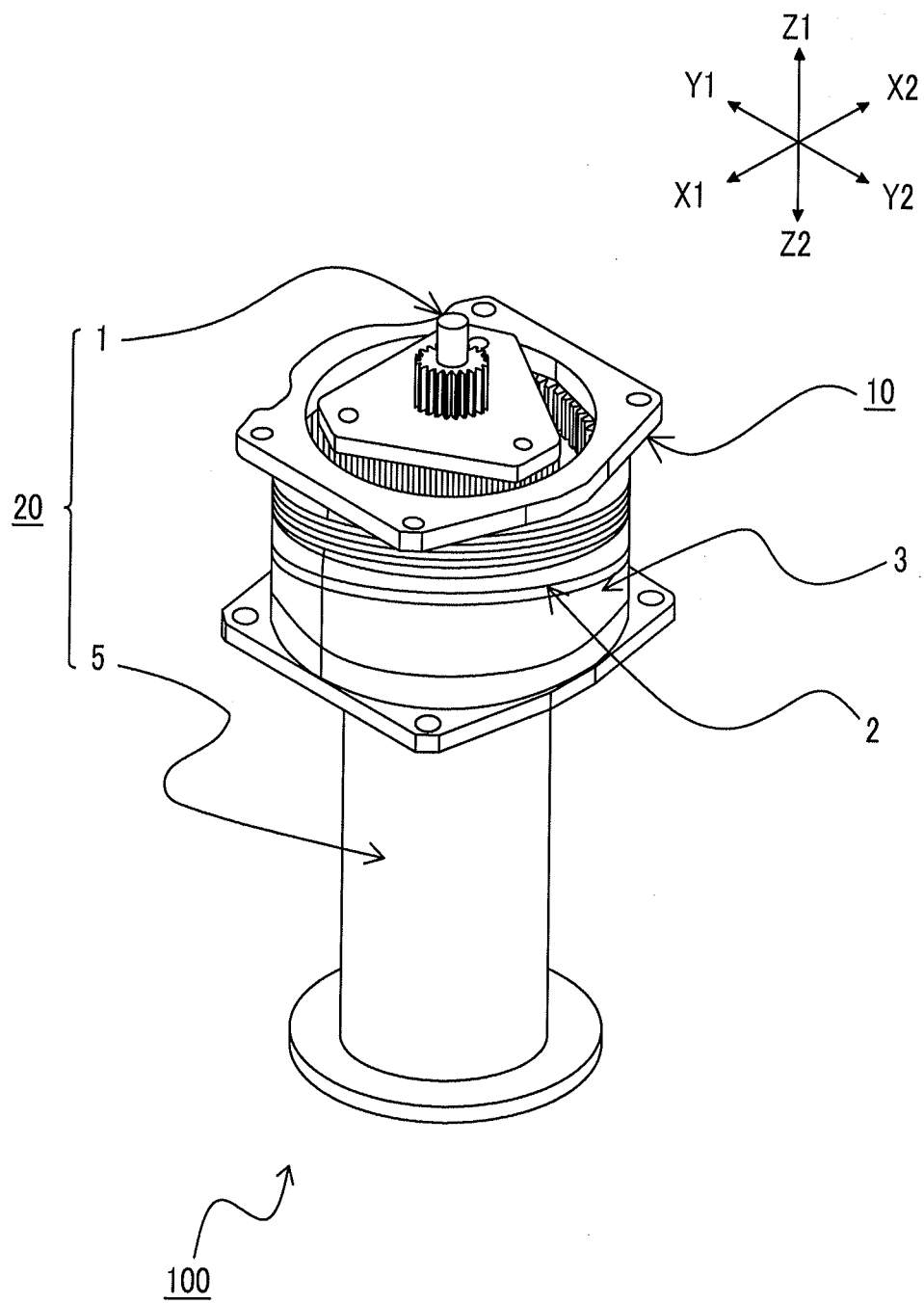
FIG. 1 is a perspective view showing an outer appearance of an electromagnetic brake unit according to a first embodiment.
Figure 2:
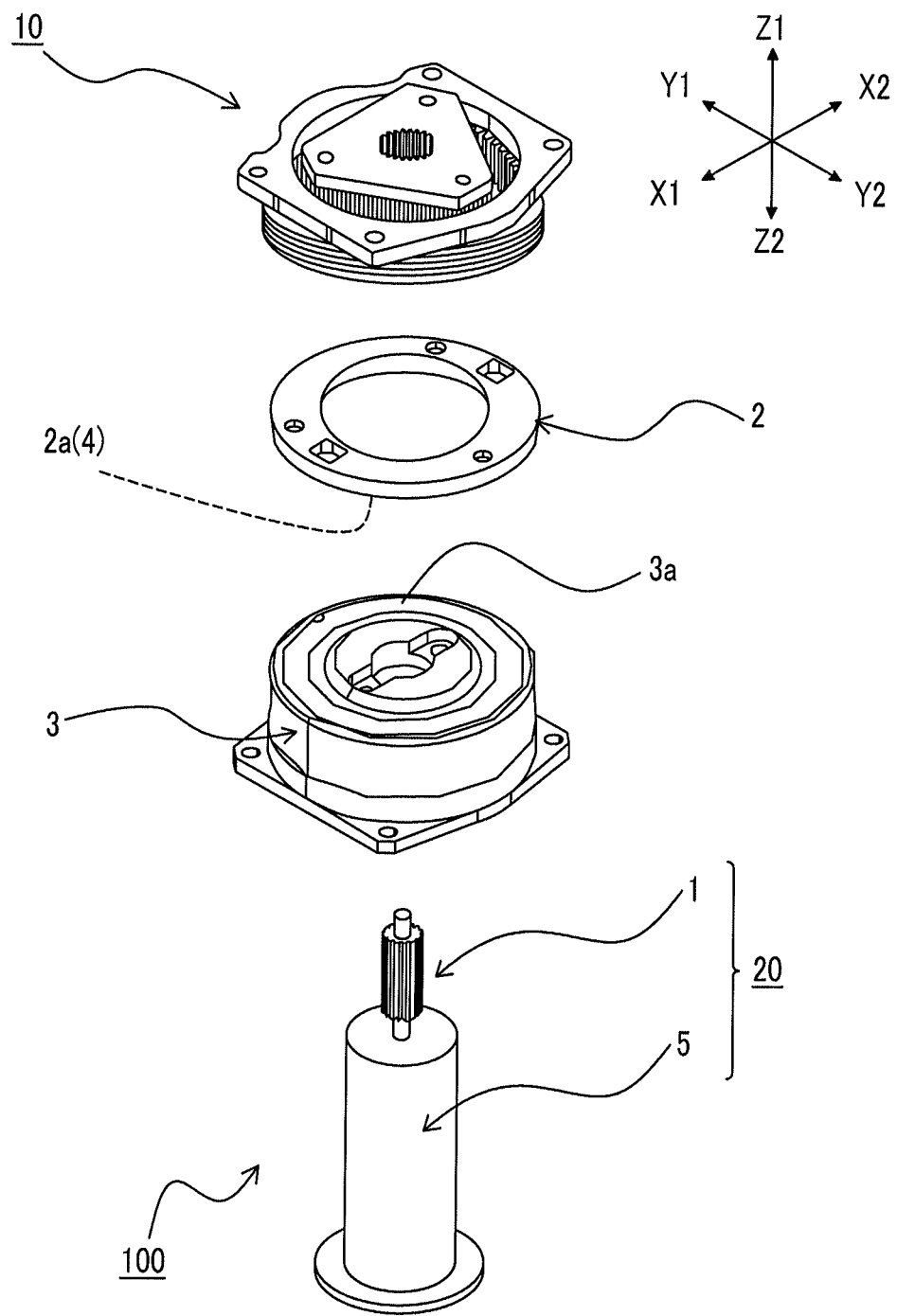
FIG. 2 is an exploded perspective view showing a configuration of the electromagnetic brake unit according to the first embodiment.
Figure 3A:
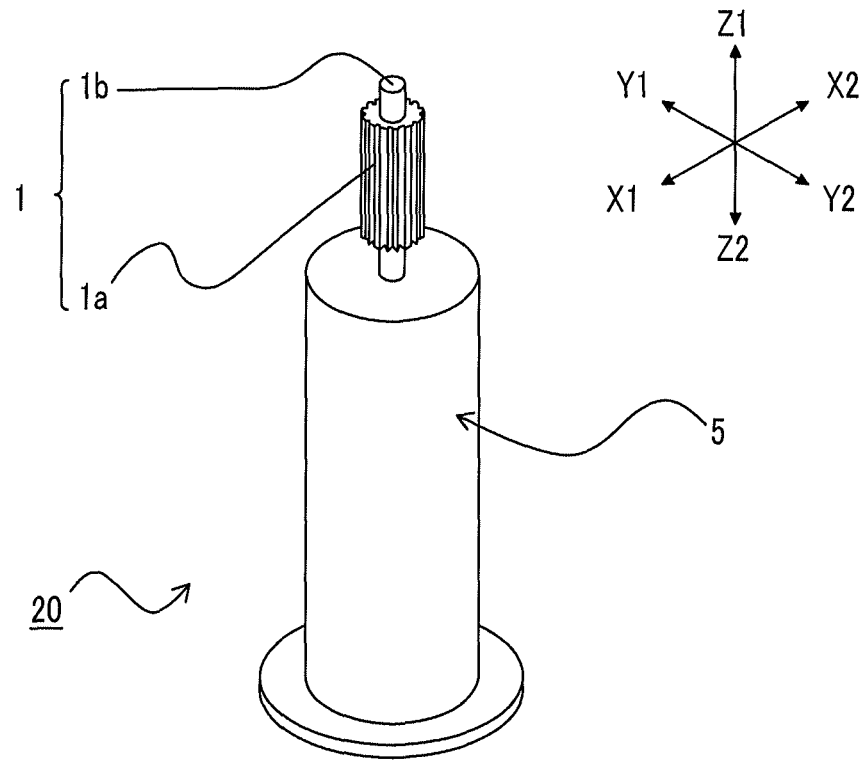
FIG. 3A is a perspective view of an operation unit of the electromagnetic brake unit according to the first embodiment.
Figure 3B:
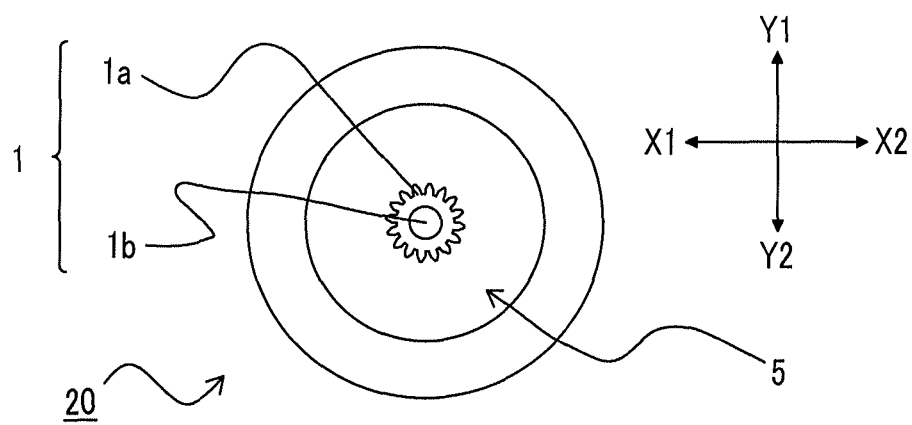
FIG. 3B is a plan view of the operation unit viewed from a Z1 direction side shown in FIG. 3A.
Figure 4A:
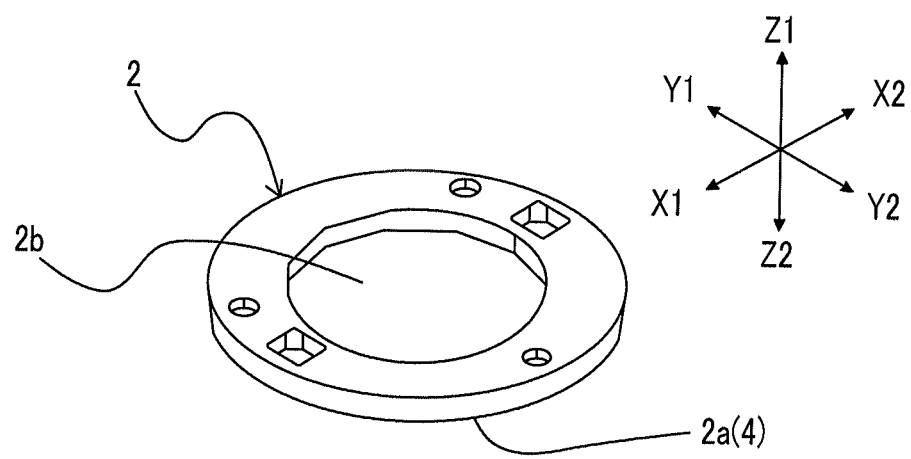
FIG. 4A is a perspective view of a rotating plate of the electromagnetic brake unit according to the first embodiment.
Figure 4B:
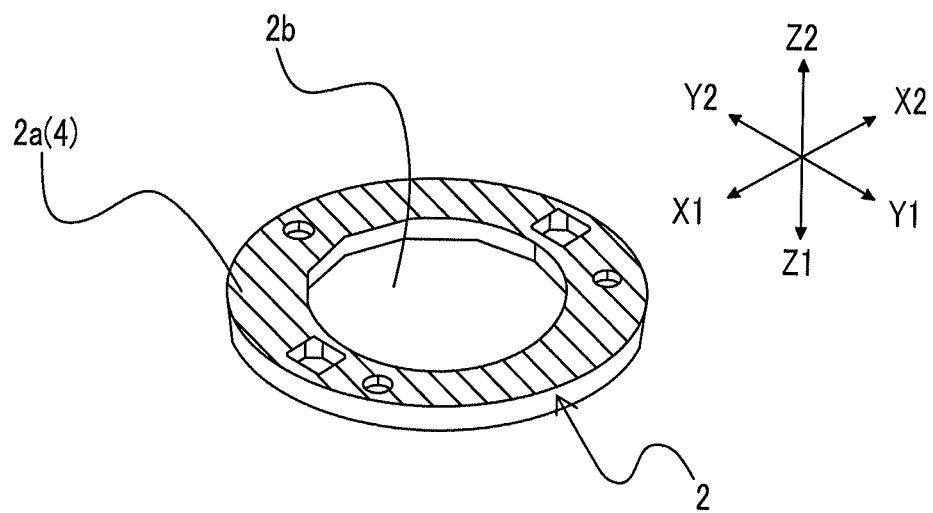
FIG. 4B is another perspective view of the rotating plate of FIG. 4A, viewed from a Z2 direction side.
Figure 5:
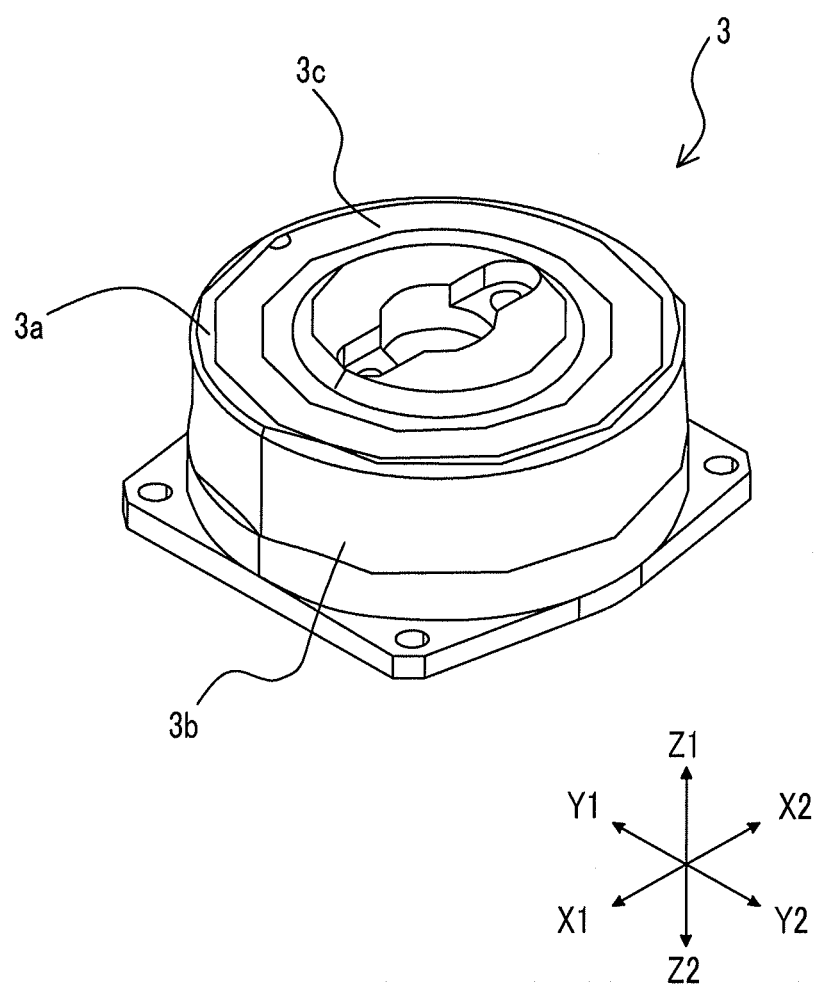
FIG. 5 is a perspective view of an electromagnetic brake of the electromagnetic brake unit according to the first embodiment.
Figure 6A:
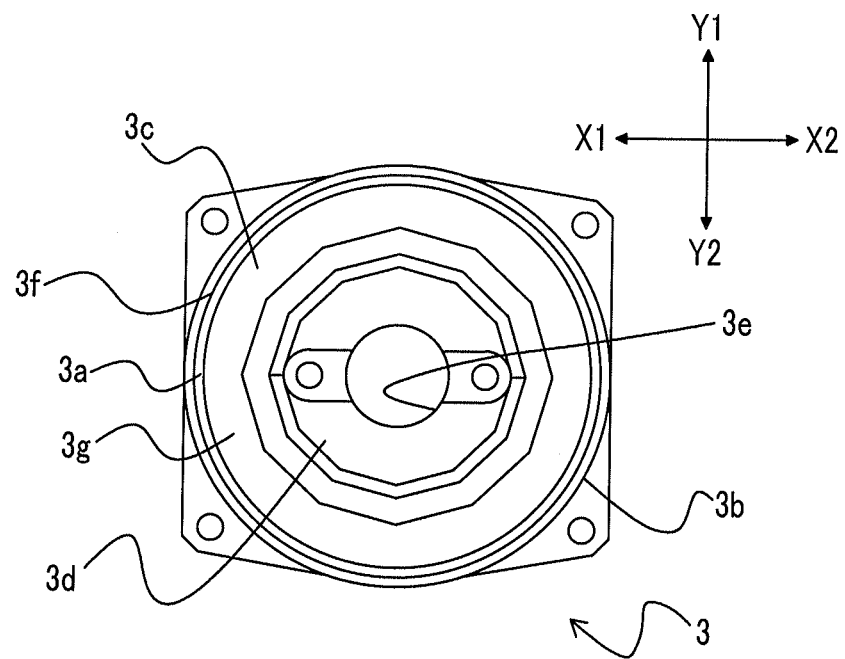
FIG. 6A is a plan view of the electromagnetic brake of the electromagnetic brake unit viewed from a Z1 direction side shown in FIG. 5 according to the first embodiment.
Figure 6B:
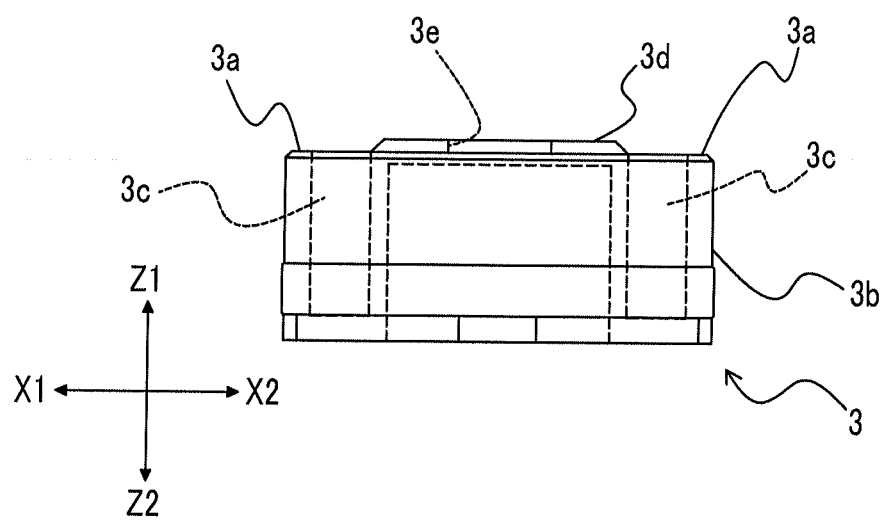
FIG. 6B is a side view of the electromagnetic brake viewed from a Y2 direction side shown in FIG. 6A.
Figure 7A:
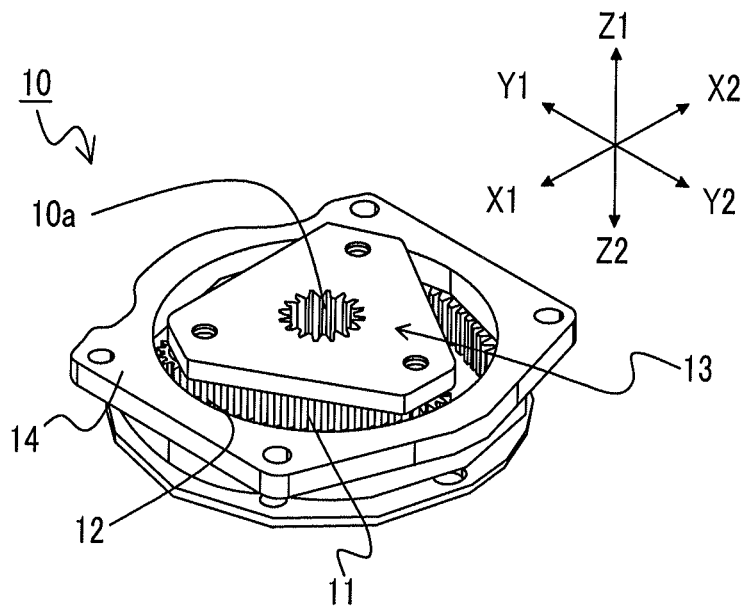
FIG. 7A is a perspective view of a speed multiplication mechanism of the electromagnetic brake unit according to the first embodiment.
Figure 7B:
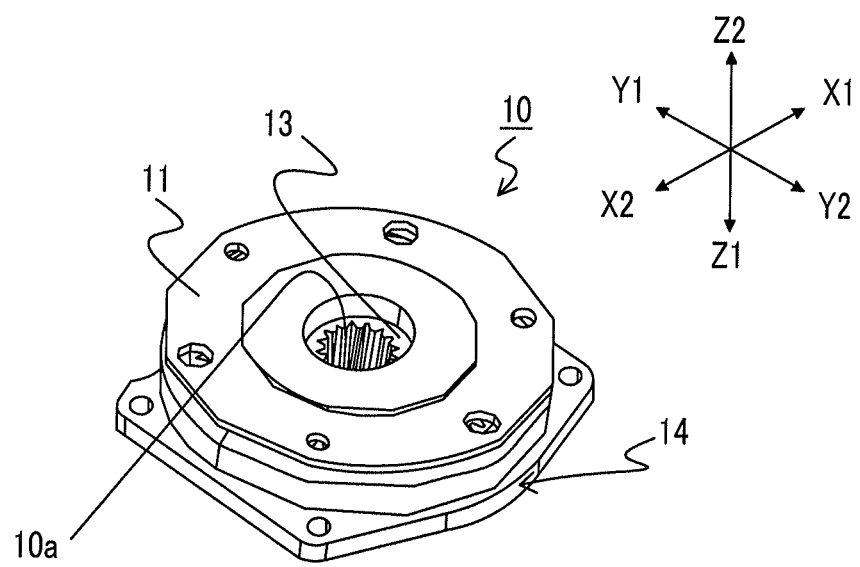
FIG. 7B is another perspective view of the speed multiplication mechanism viewed from a Z2 direction side shown in FIG. 7A.
Figure 8:
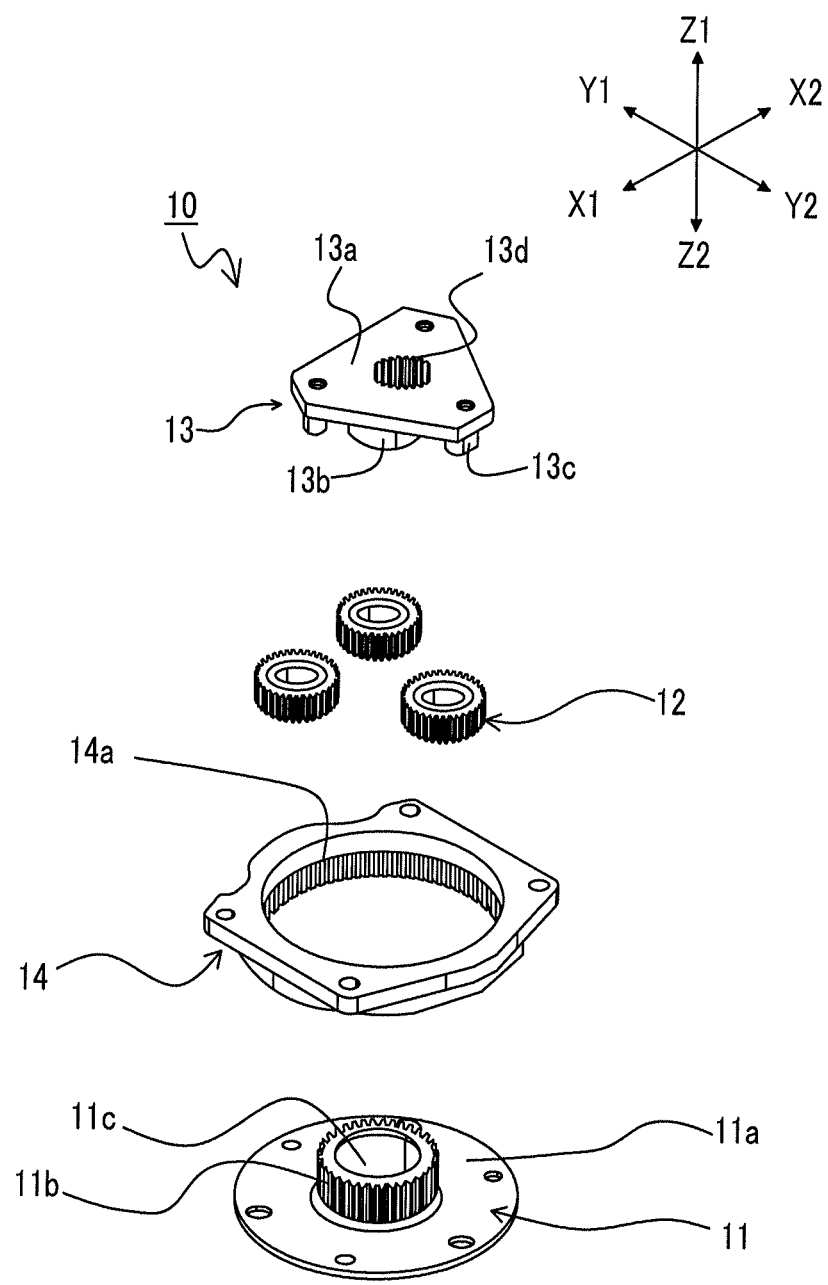
FIG. 8 is an exploded perspective view showing a configuration of the speed multiplication mechanism of the electromagnetic brake unit according to the first embodiment.
Figure 9:
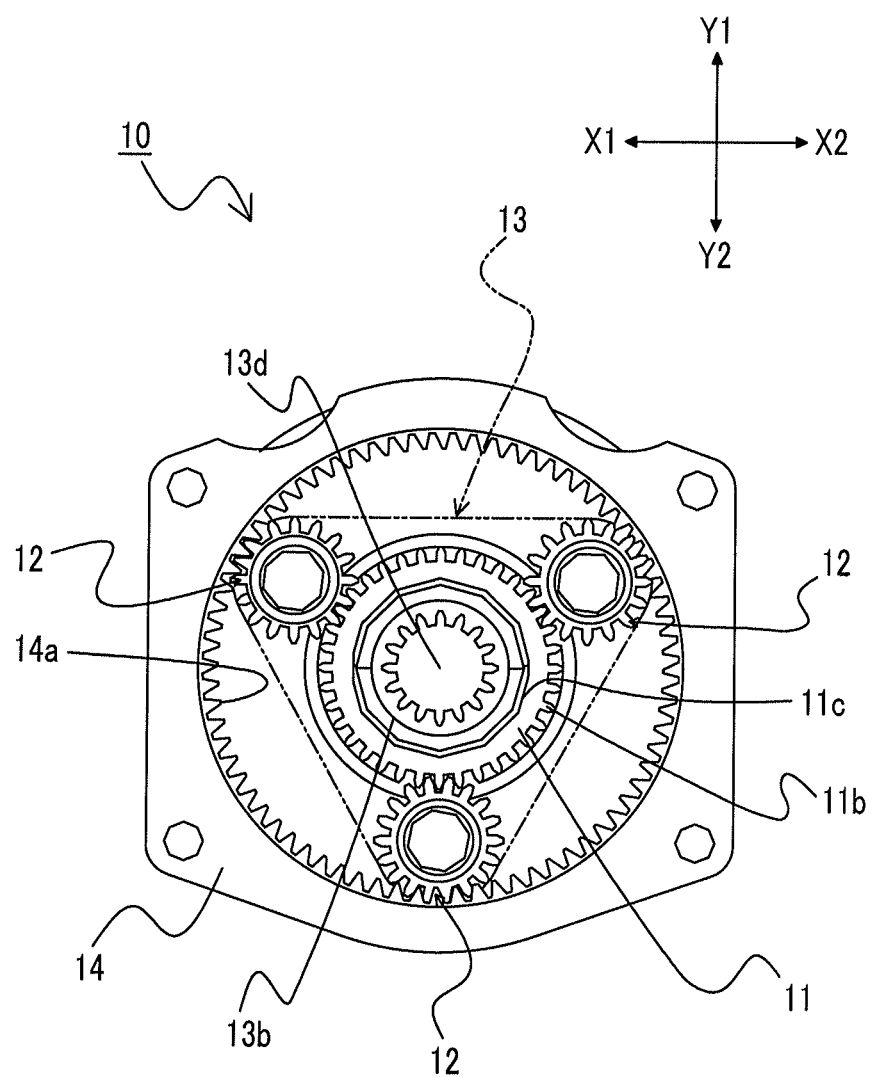
FIG. 9 is a plan view of the speed multiplication mechanism viewed from a Z1 direction side shown in FIG. 7A.

First, a configuration of the electromagnetic brake unit 100 according to this embodiment will be described referring to FIGS. 1 to 9. FIG. 1 is a perspective view showing an outer appearance of the electromagnetic brake unit 100 according to the first embodiment. FIG. 2 is an exploded perspective view showing the configuration of the electromagnetic brake unit 100 according to the first embodiment. FIG. 3A is a perspective view of the operation unit 1, and FIG. 3B is a plan view of the operation unit 1 viewed from a Z1 direction side shown in FIG. 3A. FIG. 4A is a perspective view of the rotating plate 2, and FIG. 4B is another perspective view of the rotating plate 2 viewed from a Z2 direction side shown in FIG. 4A. FIG. 5 is a perspective view showing an outer appearance of an electromagnetic brake 3 of the electromagnetic brake unit 100 according to the first embodiment. FIG. 6A is a plan view of the electromagnetic brake 3 viewed from a Z1 direction side shown in FIG. 5, and FIG. 6B is a side view of the electromagnetic brake 3 viewed from a Y2 direction side shown in FIG. 6A. A part of FIG. 6B that is shown with a dashed line schematically shows a shape. FIG. 7 is a view showing an outer appearance of a speed multiplication mechanism 10 of the electromagnetic brake unit 100 according to the first embodiment, FIG. 7A is a perspective view showing the outer appearance of the speed multiplication mechanism 10, and FIG. 7B is a perspective view of the speed multiplication mechanism 10 viewed from a Z2 direction side shown in FIG. 7A. FIG. 8 is an exploded perspective view showing a configuration of the speed multiplication mechanism 10 of the electromagnetic brake unit 100 according to the first embodiment. FIG. 9 is a plan view showing the speed multiplication mechanism 10 viewed from a Z1 direction side shown in FIG. 7A. In FIG. 9, an outer shape of a holding plate section 13a of a planetary carrier member 13 is schematically shown with a two-dot chain line in order to facilitate the description.

As shown in FIG. 2, the electromagnetic brake unit 100 includes the operation unit 1 that is rotation-operated, the rotating plate 2 that rotates coaxially with the operation unit 1 in conjunction with the operation of the operation unit 1, the electromagnetic brake 3 that can magnetically adsorb the rotating plate 2, a polymer material section 4, the speed multiplication mechanism 10 that transmits the rotating operation which is added to the operation unit 1 to the rotating plate 2, and a detection device 5 that detects a rotation angle at which the operation unit 1 is operated. In the electromagnetic brake unit 100, the operation unit 1 is exposed in a pivotable state as shown in FIG. 1, and an input operation can be performed by pivoting the operation unit 1. Also, the electromagnetic brake unit 100 can apply a braking force against pivoting of the rotating plate 2 by magnetically adsorbing the rotating plate 2 with the electromagnetic brake 3.

As shown in FIG. 3A, the operation unit 1 has a shaft 1b that is formed into a rod shape, and an engagement section 1a that is formed into a substantially cylindrical shape and is integrated with the shaft 1b to surround the shaft 1b. As shown in FIG. 3B, on an outer circumferential surface of the engagement section 1a, gear teeth are formed at regular intervals along a circumferential direction and along a direction in which the engagement section 1a extends. Also, in this embodiment, one end of the shaft 1b of the operation unit 1 is rotatably mounted on a center of one end face of the detection device 5, which is formed into a cylindrical shape. Although detailed description and illustration are omitted, a detection member that can detect rotation operations of the shaft 1b and the engagement section 1a is built into the detection device 5. Examples used as the detection member that can detect rotations of the shaft 1b and the engagement section 1a include an encoder, a rotary type variable resistor, a Hall element and the like. A detection unit 20 is configured to have the operation unit 1 and the detection device 5.

The rotating plate 2 is formed of a metallic material that is a soft magnetic body, and is formed into a disk shape as shown in FIGS. 4A and 4B. A lower side (Z2 direction side) of the rotating plate 2 is formed into a planar shape to constitute an adsorbed surface 2a that can be in contact with the electromagnetic brake 3. Also, the rotating plate 2 has a vertically penetrating first through-hole 2b in a central part thereof.

As shown in FIGS. 5, 6A and 6B, the electromagnetic brake 3 has a yoke 3b that is formed of a magnetic metallic material and is formed into a tubular shape (cylindrical shape), and a coil 3c that is formed in such a manner that a metallic wire material is wound around an outer circumference of a cylinder. As shown in FIG. 6B, one portion (Z1 direction) of the yoke 3b is open, and the yoke 3b, on one end face, has an outer circumferential section 3f that is formed into an annular flat surface along an outer shape of the yoke 3b. The outer circumferential section 3f of the yoke 3b constitutes an adsorbing surface 3a that can always be in contact with the adsorbed surface 2a of the rotating plate 2. An outer diameter dimension of the yoke 3b is almost the same as an outer diameter dimension of the rotating plate 2. Also, the other end face of the yoke 3b is not open, and a central part thereof projects in a cylindrical shape toward an inner portion (Z1 direction) of the yoke 3b so that a coil holding section 3d is formed. The coil holding section 3d is formed to project along a central axis of the yoke 3b that is formed into a cylindrical shape, and a projection-direction distal end portion of the coil holding section 3d projects further upward (Z1 direction) than the adsorbing surface 3a. Also, a second through-hole 3e penetrating in a direction in which the coil holding section 3d projects is formed on a projection-direction distal end side surface of the coil holding section 3d. An outer diameter dimension of the coil holding section 3d is almost the same as an inner diameter dimension of the first through-hole 2b of the rotating plate 2, and the second through-hole 3e is formed to have a size at which the shaft 1b and the engagement section 1a of the operation unit 1 can be inserted. The coil 3c is held within the yoke 3b in a state of being wound around the coil holding section 3d. The coil 3c that is held within the yoke 3b is slightly lower than the outer circumferential section 3f, and has an inner circumferential section 3g which is formed into a planar shape at an upper end thereof. A cover that covers the upper end of the coil 3c may be disposed so that a surface of the cover is the inner circumferential section 3g. The electromagnetic brake 3 is formed by holding the coil 3c within the yoke 3b as described above. The electromagnetic brake 3 can generate an electromagnetic force when an electric current is passed to the coil 3c.

The polymer material section 4 is softer than the metallic material of the rotating plate 2 and the yoke 3b of the electromagnetic brake 3. As shown in FIG. 4B, the polymer material section 4 is formed by baking on the adsorbed surface 2a (diagonally hatched area) of the rotating plate 2, and may be formed on at least one of the adsorbed surface 2a and the adsorbing surface 3a. Also, because the polymer material section 4 is required to have a dynamic friction coefficient of at least 0.3, it is preferable that the polymer material section 4 be formed of a material whose main component is polyimide or polyamide imide, or alternatively, phenol. In a baking process, polyimide can ensure a dynamic friction coefficient of slightly over 0.6, polyamide imide can ensure a dynamic friction coefficient of slightly over 0.3, and phenol can ensure a dynamic friction coefficient of approximately 0.9. Specifically, polyimide, polyethylene naphthalate and the like are suitable. Polyimide is used in this embodiment.

As shown in FIGS. 7A and 7B, the speed multiplication mechanism 10 is formed into a substantially cylindrical shape. An engagement hole 10a that is a through-hole, which can be engaged with the engagement section 1a of the operation unit 1, is formed at a center of the speed multiplication mechanism 10. Gear teeth that can be engaged with the gear teeth, which are formed on an outer circumference of the engagement section 1a, are formed on an inner wall of the engagement hole 10a. An outer diameter dimension of the speed multiplication mechanism 10 is almost the same as the outer diameter dimension of the rotating plate 2.

The speed multiplication mechanism 10 uses a planetary gear mechanism. As shown in FIG. 8, the speed multiplication mechanism 10 has a sun gear member 11 that has a sun gear function, three planetary gear members 12 that function as planetary gears, a planetary carrier member 13 that functions as a planetary carrier, and an inner gear member 14 as an inner gear.

The sun gear member 11 has a flat portion 11a that is formed into a disk shape, and a sun gear portion 11b that projects upward (Z1 direction) from a central part of the flat portion 11a and is formed into a cylindrical shape. 36 gear teeth are formed as a sun gear at a predetermined pitch on an outer circumference of the sun gear portion 11b. Also, an insertion hole 11c penetrating in a direction in which the sun gear portion 11b extends (Z1-Z2 direction) is formed in the sun gear portion 11b.

A cross-section of the inner gear member 14 is formed into a circular tubular shape. An inner gear portion 14a is formed on an inner circumferential surface of the inner gear member 14, and 72 gear teeth are formed as an inner gear at a predetermined pitch in the inner gear portion 14a. An outer diameter dimension of the inner gear member 14 is substantially the same as an outer diameter dimension of the flat portion 11a of the sun gear member 11.

A cross-section of the planetary gear member 12 is formed into a circular tubular shape. 18 gear teeth are formed on an outer circumferential surface of the planetary gear member 12 at a predetermined pitch as a planetary gear that can be engaged with both of the gear teeth of the inner gear portion 14a and the sun gear portion 11b.

The planetary carrier member 13 has a holding plate section 13a that is formed of a synthetic resin material and is formed into a substantially triangular flat plate shape, a cylindrical portion 13b that projects downward (Z2 direction) from a central part of the holding plate section 13a and is formed into a cylindrical shape, and shaft portions 13c that respectively project downward from three corner portions of the holding plate section 13a and are formed into a columnar shape. A gear hole 13d penetrating in a direction in which the cylindrical portion 13b extends (Z1-Z2 direction) is formed in the cylindrical portion 13b, and gear teeth that can be engaged with the engagement section 1a of the operation unit 1 are formed on an inner circumferential wall of the gear hole 13d. Also, an outer diameter dimension of the cylindrical portion 13b has a size that can be inserted into the insertion hole 11c of the sun gear member 11.

In the speed multiplication mechanism 10 that is formed from the above-described components, the inner gear member 14 is superimposed on the sun gear member 11 and is placed in such a manner that the sun gear portion 11b is at a central position of the inner gear member 14 as shown in FIG. 9. Also, the planetary gear members 12 are rotatably supported at three places of the planetary carrier member 13 in a state where the shaft portion 13c (refer to FIG. 8) is inserted inside. In this manner, the planetary gear members 12 that are supported by the planetary carrier member 13 are placed between the sun gear portion 11b and the inner gear portion 14a. The planetary gear members 12 that are placed in this manner are engaged with both of the gear teeth of the sun gear portion 11b and the inner gear portion 14a, and the sun gear portion 11b and the inner gear portion 14a are connected with each other by the planetary gear members 12. Also, the cylindrical portion 13b of the planetary carrier member 13 is inserted into the insertion hole 11c, and the planetary carrier member 13 is placed to be rotatable about the cylindrical portion 13b. The gear hole 13d is formed as the engagement hole 10a by having the cylindrical portion 13b inserted and placed into the insertion hole 11c. The speed multiplication mechanism 10 is formed by having each of these components placed in this manner.

Detailed description of the planetary gear mechanism will be omitted. When the planetary carrier member 13 is rotated with the engagement hole 10a as a center of rotation, the planetary gear members 12 are rotated and moved in a direction of rotation of the planetary carrier member 13. When the planetary gear members 12 are rotated and moved, power is transmitted also to the sun gear portion 11b and the sun gear member 11 is rotated. When the speed multiplication mechanism 10 is operated in this manner, the planetary carrier member 13 is input, the inner gear member 14 is fixed, and the planetary gear members 12 are output, and thus a rotational speed of the sun gear member 11 is higher than a rotational speed of the planetary carrier member 13.

Figure 10:
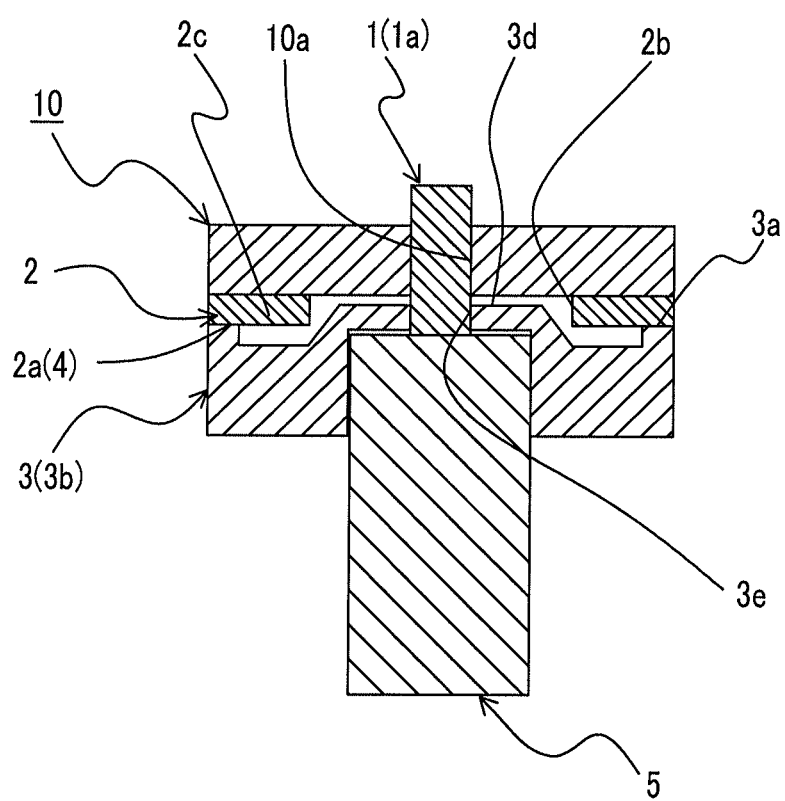
FIG. 10 is a schematic cross-sectional view showing a structure of the electromagnetic brake unit according to the first embodiment.

Next, a structure of the electromagnetic brake unit 100 will be described referring to FIG. 10. FIG. 10 is a schematic cross-sectional view showing the structure of the electromagnetic brake unit 100 according to the first embodiment. FIG. 10 shows the structure in a schematic form in order to facilitate the description.

As shown in FIG. 10, the rotating plate 2 and the electromagnetic brake 3 oppose each other so that the adsorbing surface 3a that is the one end face of the yoke 3b is a flat surface parallel to the adsorbed surface 2a where the polymer material section 4 is formed, and the electromagnetic brake 3 is placed to be in contact with the rotating plate 2. In other words, the adsorbing surface 3a and the adsorbed surface 2a are brought into contact with each other so that the rotating plate 2 is placed in such a manner that the inner circumferential section 3g is superimposed on the electromagnetic brake 3 in a state of opposing the rotating plate 2 via a gap. In this case, the distal end portion of the coil holding section 3d is inserted into the first through-hole 2b of the rotating plate 2, and the rotating plate 2 can slidingly rotate on the adsorbing surface 3a with the coil holding section 3d as a center of rotation. Also, the speed multiplication mechanism 10 is placed to be superimposed on the rotating plate 2. In this case, the sun gear member 11 of the speed multiplication mechanism 10 and the rotating plate 2 are locked to each other by screwing or the like, and thus the rotating plate 2 and the speed multiplication mechanism 10 can be rotation-operated in conjunction with each other. The operation unit 1 is inserted into the electromagnetic brake 3, the rotating plate 2, and the speed multiplication mechanism 10 that are placed to be superimposed on each other from an electromagnetic brake 3 side in a direction toward the speed multiplication mechanism 10. In other words, the operation unit 1 is inserted into the second through-hole 3e of the electromagnetic brake 3 (and the first through-hole 2b of the rotating plate 2 at the same time), and then is inserted into the engagement hole 10a of the speed multiplication mechanism 10. Then, the operation unit 1 is inserted to a position projecting from the speed multiplication mechanism 10 so that the rotating plate 2 is placed below the operation unit 1. The engagement section 1a of the operation unit 1 and the engagement hole 10a of the speed multiplication mechanism 10 are engaged with each other by the gear teeth, and thus the operation unit 1 is connected to the speed multiplication mechanism 10 and the operation unit 1 and the speed multiplication mechanism 10 can be operated in conjunction with each other. The electromagnetic brake unit 100 is formed by having each of these components placed in this manner.

Next, an operation of the electromagnetic brake unit 100 will be described.

When the operation unit 1 is rotation-operated, the electromagnetic brake unit 100 can detect the rotation angle, the number of rotations and the like thereof for external output by using the detection device 5 which is connected to the shaft 1b of the operation unit 1. Also, when the operation unit 1 is rotation-operated, the rotating operation added to the operation unit 1 is transmitted to the rotating plate 2 via the speed multiplication mechanism 10. The rotating plate 2 to which the rotating operation is transmitted coaxially rotates with the operation unit 1 in conjunction with the operation of the operation unit 1. Also, a rotational speed of the rotating plate 2 to which the rotating operation is transmitted via the speed multiplication mechanism 10 is higher than a rotation speed of the operation unit 1 in operation. Also, when the coil 3c of the electromagnetic brake 3 is electrified, the electromagnetic brake 3 generates an electromagnetic force and can magnetically adsorb the rotating plate 2. In other words, in a case where the electromagnetic brake 3 magnetically adsorbs the rotating plate 2, the electromagnetic brake 3 applies a braking force against rotation of the rotating plate 2 to force an operation to be stopped. In a case where the electromagnetic brake 3 does not magnetically adsorb the rotating plate 2, the rotating plate 2 can be rotated in a state of being in contact with the electromagnetic brake 3.

Hereinafter, an effect of this embodiment will be described.

The electromagnetic brake unit 100 of the first embodiment includes the operation unit 1 that is rotation-operated, the rotating plate 2 that is placed below the operation unit 1 and coaxially rotates with the operation unit 1 in conjunction with the operation of the operation unit 1, and the electromagnetic brake 3 that is placed to be in contact with the rotating plate 2 and can magnetically adsorb the rotating plate 2, the rotating plate 2 has the adsorbed surface 2a that is in contact with the electromagnetic brake 3, and the electromagnetic brake 3 has the adsorbing surface 3a that is in contact with the rotating plate 2. The electromagnetic brake 3 applies the braking force against the pivoting of the rotating plate 2 in a case where the electromagnetic brake 3 magnetically adsorbs the rotating plate 2, the rotating plate 2 can pivot in contact with the electromagnetic brake 3 in a case where the electromagnetic brake 3 does not magnetically adsorb the rotating plate 2, and the electromagnetic brake unit is configured in such a manner that the polymer material section 4 is formed on at least one of the adsorbed surface 2a and the adsorbing surface 3a.

In this manner, the polymer material section 4 is formed on at least one of the adsorbed surface 2a and the adsorbing surface 3a. Accordingly, even when the adsorbing surface 3a and the adsorbed surface 2a are slid by operating the operation unit 1, a scratch is less likely on a sliding surface than in a case where metals are slid against each other because the polymer material section 4 is softer than a metal, and thus a smooth operation is possible without a feeling of being caught at a time of non-braking and a good operation feeling can be achieved. Also, the good operation feeling can be maintained insofar as the polymer material section 4 remains, although the polymer material section 4 is worn due to the rotating operation. Further, even when the polymer material section 4 completely disappears due to the sliding wear, a scratch is unlikely in a metallic part because wear debris of the polymer material section 4 is interposed between the adsorbing surface 3a and the adsorbed surface 2a, and thus the good operation feeling can be maintained. Accordingly, it is possible to provide the electromagnetic brake unit with which the good operation feeling can be maintained.

Also, since the electromagnetic brake 3 and the rotating plate 2 are configured to slide via the polymer material section 4, an adsorption phenomenon between the electromagnetic brake 3 and the rotating plate 2 caused by interposed moisture can be avoided even when the moisture is interposed between the electromagnetic brake 3 and the rotating plate 2. Accordingly, even when the moisture is interposed between the electromagnetic brake 3 and the rotating plate 2, it is possible to provide the electromagnetic brake unit with which the good operation feeling can be maintained.

Also, in the electromagnetic brake unit 100 of the first embodiment, the polymer material section 4 is configured to be formed by baking on at least one of the adsorbed surface 2a and the adsorbing surface 3a.

In this manner, the polymer material section 4 is unlikely to be peeled off from the adsorbed surface 2a or the adsorbing surface 3a, and can be formed to be thin with a uniform thickness. By forming the polymer material section 4 in this manner, the smooth operation without the feeling of being caught is more likely and the good operation feeling can be further reliably achieved as the effect achieved by this embodiment when the adsorbed surface 2a and the adsorbing surface 3a are slid. Also, since the polymer material section 4 can be formed to be thin with a uniform thickness, the electromagnetic brake unit can have substantially the same height dimension as in a case where a structure of the related art (structure with no polymer material section) is adopted.

Also, in the electromagnetic brake unit 100 of the first embodiment, the dynamic friction coefficient of the polymer material section 4 is configured to be at least 0.3.

In this manner, since the dynamic friction coefficient of the polymer material section 4 is at least 0.3, the smooth operation without the feeling of being caught is possible at a time of non-braking as the effect achieved by this embodiment, and, at a time of braking, it is possible to avoid a significant decrease in the braking force that is generated compared to the braking force in a case of the related art when the metals are in contact with each other.

Also, in the electromagnetic brake unit 100 of the first embodiment, the polymer material section 4 is configured to be formed of polyimide or polyethylene naphthalate.

Since the polymer material section 4 is formed of these materials, the dynamic friction coefficients of the adsorbed surface 2a and the adsorbing surface 3a can be ensured to be at least 0.3 and further can be ensured to be at least 0.6, which is equal to or greater than the dynamic friction coefficient from the sliding between the metals, and thus a large braking force can be maintained at a time of braking. Further, these materials are excellent in heat resistance, and thus have high durability against frictional heat and are unlikely to deteriorate even when frictional heat is generated at a time of braking. Accordingly, the braking force can be maintained while the good operation feeling can be maintained with higher stability as the effect achieved by this embodiment.

Also, in the electromagnetic brake unit 100 of the first embodiment, the electromagnetic brake 3 has the yoke 3b that is formed into a tubular shape, the yoke 3b has the outer circumferential section 3f and the inner circumferential section 3g that is formed to be slightly lower than the outer circumferential section 3f, the outer circumferential section 3f constitutes the adsorbing surface 3a that is always in contact with the rotating plate 2, and the inner circumferential section 3g is configured to oppose the rotating plate 2 via the gap.

In this manner, only the outer circumferential section 3f of the yoke 3b that is formed into a tubular shape is the sliding surface against the rotating plate 2 and the adsorbing surface 3a all the time and an area of contact between the adsorbing surface 3a and the adsorbed surface 2a is small and frictional resistance is small, and thus the smooth operation without the feeling of being caught is possible at a time of non-adsorption and the good operation feeling can be maintained. Also, even if a foreign substance is caught between the adsorbing surface 3a and the adsorbed surface 2a, the foreign substance is likely to fall from the adsorbing surface 3a since the adsorbing surface 3a is annular-shaped, and a scratch is unlikely at a place where the adsorbing surface 3a and the adsorbed surface 2a are slid. Accordingly, a better operation feeling can be maintained as the effect achieved by this embodiment.

Also, in the electromagnetic brake unit 100 of the first embodiment, the operation unit 1 is configured to be connected to the speed multiplication mechanism 10 that can multiply the rotating operation which is added, and the rotating operation which is added to the operation unit 1 is configured to be transmitted to the rotating plate 2 via the speed multiplication mechanism 10.

In this manner, the rotating plate 2 can be rotated at a higher rotational speed than the rotational speed of the operation unit 1. When the rotational speed is high, an operator is unlikely to have an operation feeling (for example, the feeling of being caught) which is felt when the rotational speed is low. Accordingly, even when a scratch is made on the adsorbed surface 2a or the adsorbing surface 3a for some reason, the feeling of being caught felt by the operator via the operation unit 1 is mitigated through the operation via the speed multiplication mechanism 10, and the good operation feeling can be maintained as the effect achieved by this embodiment. Also, by using the speed multiplication mechanism, the braking force of the operation unit 1 can be increased by a speed increase ratio thereof even in a case where the braking force of the electromagnetic brake is small, and thus a required braking force can be ensured as the effect achieved by this embodiment.

Also, in the electromagnetic brake unit 100 of the first embodiment, the speed multiplication mechanism 10 is configured to use the planetary gear mechanism.

In this manner, by using the planetary gear mechanism in the speed multiplication mechanism 10, the speed multiplication mechanism can be coaxially configured, and thus an increase in space can be suppressed to a minimum and a change to a desired multiplication rate is likely by changing a gear ratio of the planetary gear mechanism when necessary. In particular, in a case where size of the electromagnetic brake unit itself is changed, an adjustment for the good operation feeling is likely as the effect achieved by this embodiment.

The electromagnetic brake unit according to the embodiment of the present invention has been described in detail as above, but the present invention is not limited to the above-described embodiment and various modifications are possible without departing from the spirit thereof. For example, the embodiment can be modified in the following manners within the scope of the present invention.

Figure 11:
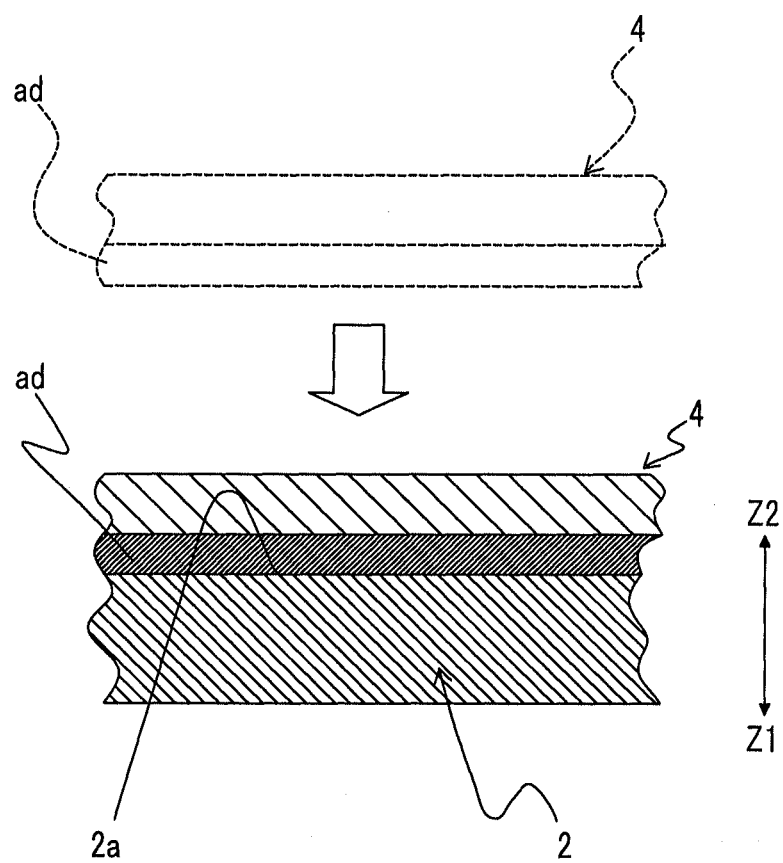
FIG. 11 is a schematic cross-sectional view showing a configuration of a polymer material section of a modification example of the electromagnetic brake unit.
Figure 12:
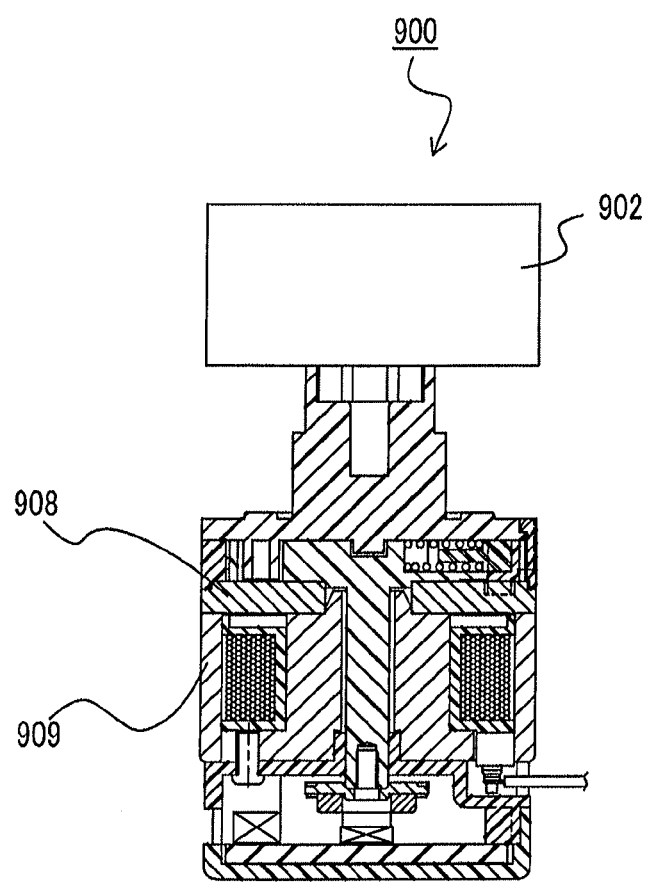
FIG. 12 is a cross-sectional view showing a configuration of a rotary input device according to Japanese Patent Application No. 2012-38806.

(1) In the first embodiment, the polymer material section 4 is formed by baking on the adsorbed surface 2a of the rotating plate 2. However, as shown in FIG. 11, a polyimide film or a polyethylene naphthalate film that has one surface applied or attached with an adhesive ad and is formed into a sheet shape may be configured to be attached to the adsorbed surface 2a of the rotating plate 2 via the adhesive ad. In addition, the polymer material section 4 may be attached to the adsorbing surface 3a or may be attached to at least one of the adsorbed surface 2a and the adsorbing surface 3a. Since the polymer material section 4 is attached via the adhesive ad, the wear debris of the polymer material section 4 is attached to the adhesive ad even when the polymer material section 4 is worn and is likely to remain interposed between the adsorbed surface 2a and the adsorbing surface 3a. Since the wear debris of the polymer material section 4 is interposed between the adsorbed surface 2a and the adsorbing surface 3a, the good operation feeling can be maintained as the effect achieved by this embodiment as with before the polymer material section 4 is worn. Also, in the example of FIG. 11, the polymer material section 4 is attached to the adsorbed surface 2a of the rotating plate 2. Compared to the adsorbing surface 3a, the adsorbed surface 2a is more likely to be attached to the polymer material section 4, an attachment error is less likely to be generated, and the good operating feeling can be maintained with higher reliability as the effect achieved by this embodiment.

(2) In the first embodiment, the polymer material section 4 is formed on the adsorbed surface 2a of the rotating plate 2. However, the polymer material section 4 may be formed on the adsorbing surface 3a of the electromagnetic brake 3, and may be formed on both of the adsorbed surface 2a and the adsorbing surface 3a.

(3) In the first embodiment, the polymer material section 4 is formed of polyimide or polyethylene naphthalate. However, the polymer material section 4 may be formed of a polymer material that can achieve the same effect as the polyimide or the polyethylene naphthalate.

(4) In the first embodiment, the number of the gear teeth of the sun gear member 11 of the speed multiplication mechanism 10 is configured to be 36, the number of the gear teeth of the inner gear member 14 is configured to be 72, and the number of the gear teeth of the planetary gear member 12 is configured to be 18. However, the gear ratio may be changed when necessary.

(5) In the first embodiment, the three planetary gear members 12 are configured to be used. However, the number of the planetary gear members 12 that are used may be changed according to a size of the speed multiplication mechanism 10 and the like.

(6) In the first embodiment, the detection device that can detect the rotations of the shaft 1b and the engagement section 1a is an encoder, a rotary type variable resistor, a Hall element or the like. However, the detection device is not limited thereto.

It should be understood by those skilled in the art that various modifications, combinations, sub-combinations and alterations may occur depending on design requirements and other factors insofar as they are within the scope of the appended claims of the equivalents thereof.

What is claimed is:

1. A magnetic brake unit comprising:
an operation unit that is rotation-operated;
a rotating plate placed below the operation unit and coaxially rotating with the operation unit in conjunction with an operation of the operation unit; and
an electromagnetic brake that is placed in contact with the rotating plate and can magnetically adsorb the rotating plate,
wherein the rotating plate, on a lower side, includes an adsorbed surface in contact with the electromagnetic brake,
wherein the electromagnetic brake, on an upper side, includes an adsorbing surface in contact with the rotating plate and the magnetic brake includes a yoke having a tubular shape, and the yoke has an outer circumferential section and an inner circumferential section that is slightly lower than the outer circumferential section,
wherein the electromagnetic brake applies a braking force against a pivoting to the rotating plate in a case where the electromagnetic brake magnetically adsorbs the rotating plate,
wherein the rotating plate is pivotable in a state of being in contact with the electromagnetic brake in a case where the electromagnetic brake does not magnetically adsorb the rotating plate, and
wherein a polymer material section is on at least one of the adsorbed surface and the adsorbing surface, and
wherein the outer circumferential section of the yoke constitutes the adsorbing surface always in contact with the rotating plate, and the inner circumferential section opposes the rotating plate via a gap.

2. The magnetic brake unit according to claim 1,
wherein the polymer material section is formed by baking on at least one of the adsorbed surface and the adsorbing surface.

3. The magnetic brake unit according to claim 1,
wherein the polymer material section has a sheet shape with an adhesive ad applied or attached to one surface, and is attached via the adhesive ad to at least one of the adsorbed surface and the adsorbing surface.

4. The magnetic brake unit according to claim 1,
wherein a dynamic friction coefficient of the polymer material section is at least 0.3.

5. The magnetic brake unit according to claim 1,
wherein the polymer material section comprises one of polyimide or polyethylene naphthalate.

6. The magnetic brake unit according to claim 1,
wherein the operation unit is connected to a speed multiplication mechanism that can multiply a rotating operation which is added, and the rotating operation added to the operation unit is transmitted to the rotating plate via the speed multiplication mechanism.

7. The magnetic brake unit according to claim 6,
wherein the speed multiplication mechanism comprises a planetary gear mechanism.

\* \* \* \* \*